April 6, 1937.  M. KATCHER  2,076,373

DRIVEN MEMBER OF A CLUTCH

Filed March 25, 1936

INVENTOR
Morris Katcher
BY
Emanuel Scheyer
ATTORNEY

Patented Apr. 6, 1937

2,076,373

UNITED STATES PATENT OFFICE 2,076,373

DRIVEN MEMBER OF A CLUTCH

Morris Katcher, New York, N. Y.

Application March 25, 1936, Serial No. 70,748

11 Claims. (Cl. 192—68)

This invention relates to a driven member for friction clutches of the kind wherein the driven member is interposed between two parts of a driving member and is adapted to be gripped or clamped by the parts under sufficient pressure to impart motion from the driving member to the driven member. The invention is particularly desirable in a friction clutch for automobiles.

An object of this invention is to provide a cushioned driven member of this type which shall be sufficiently yieldable to take hold smoothly, evenly and quickly and without setting up vibrations in the clutch or carrying forward engine vibrations to the transmission. The cushioning effect is obtained by mounting springs between the parts of the driven member. It is another object of the invention to employ a construction having a minimum number of parts to maintain the springs in place in the driven member, resulting in simplicity, ease of assembly and cheapness.

In the prior art, the friction member has been constructed to overlap both faces of the hub member flange, as in Patents Nos. 1,830,746 and 1,889,698, where a main plate is shown overlapping one face of a hub member flange and a side plate attached to the main plate overlaps the other face of said flange. My construction does away with the side plate.

Other objects and advantages will become apparent upon a further study of the description and drawing, in which:—

Figure 1:
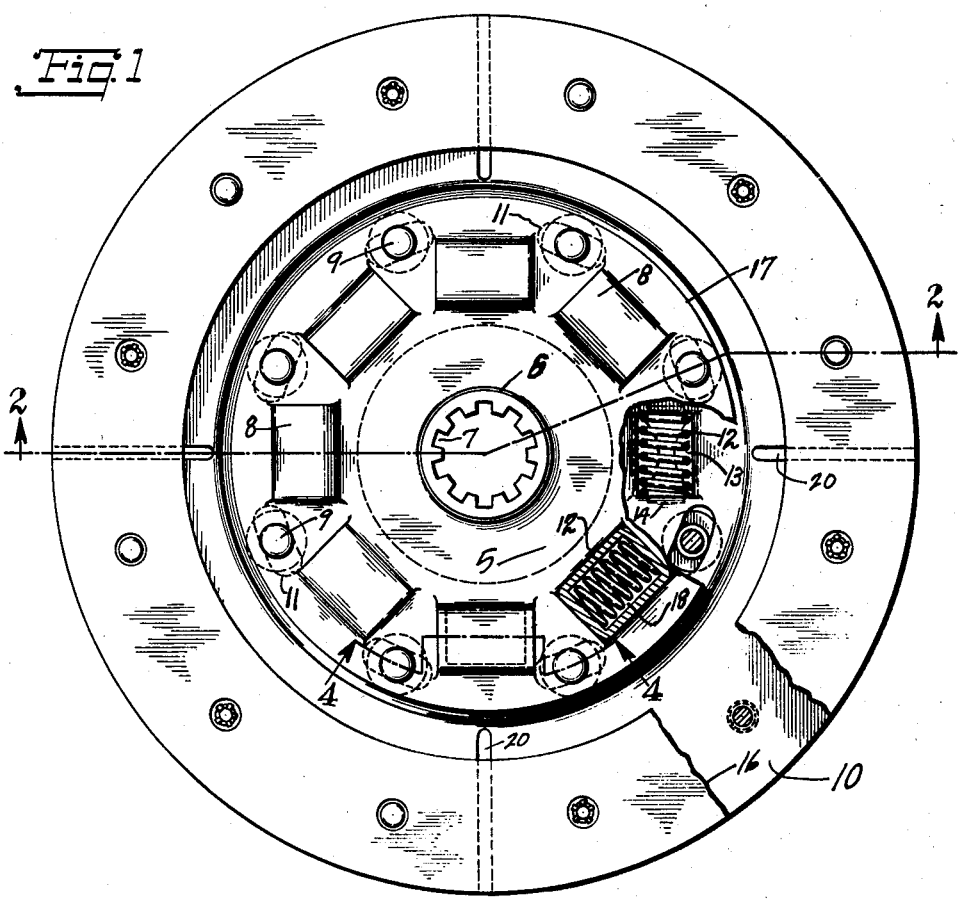
Fig. 1 is an elevation of one side of the friction clutch member, with a portion of the hub member and friction facing shown broken away.
Figure 2:
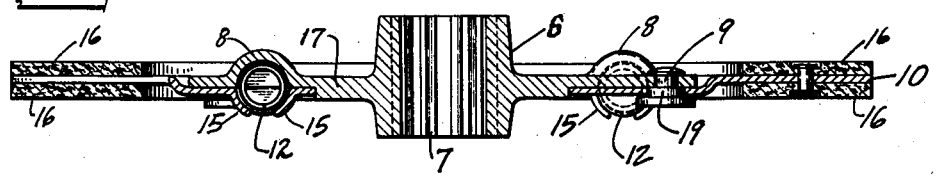
Fig. 2 is a section taken along the line 2—2 of Fig. 1.
Figure 3:
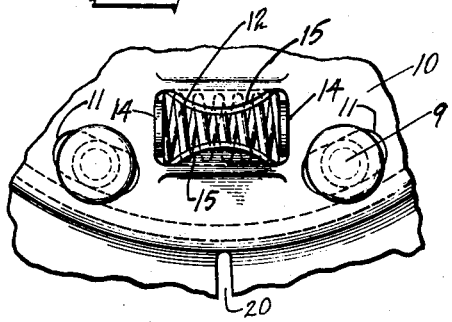
Fig. 3 is a fragmental elevation to an enlarged scale of the other side of the clutch from that shown in Fig. 1.
Figure 4:
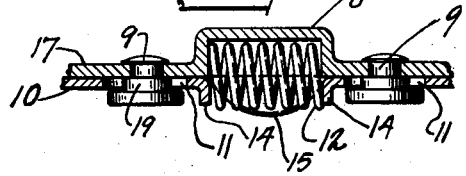
Fig. 4 is a partial section to an enlarged scale taken along the line 4—4 of Fig. 1.

Hub member 5 is provided with a hub 6, having keyways 7 for splining it to a shaft. The flange portion 17 of hub member 5 has a number of semi-cylindrical housings 8 pressed therefrom, which thereby form a covering over openings in said flange portion, one of said openings being shown at 18. Attached to hub member 5 by means of shouldered rivets 9, is a friction member 10. Flange 17 of hub member 5 is provided at its outer portion with an annular recess into which extends the portion of friction member 10 that overlaps said hub. Each rivet 9 is fixedly attached to flange 17 which is gripped between the small head of the rivet and shoulder 19. The shoulder 19 of each rivet 9 has a sliding fit in an elongated arcuate slot 11 concentric with the hub, and the large head of the rivet is slidable with respect to the surface of plate 10 adjacent the slot. The sliding of rivets 9 in elongated slots 11 permits of a limited relative rotation between hub member 5 and friction plate 10.

The limited relative rotation between the hub and friction members together with springs 12, as will be now explained, provide a cushioning effect between the driving action of friction member 10 and hub member 5. The outer portion of friction member 10 is substantially in radial alignment with flange 17 of the hub member 5. The inner portion of friction member 10 is bent over from the outer portion so as to come against one face of flange 17.

Friction plate 10 is provided with a number of oblong openings 13 in which springs 12 are located. At the two short edges of each opening engaging the end of a spring 12 are lips 14. Along the long edges of the opening are curved lugs 15, preventing spring 12 from dropping through and out of friction plate 10. Housings 8 on hub member 5, hold springs 12 from passing through and out of said hub member. The flat end walls of housings 8 are equivalent to lips 14. The outer portions of friction member 10 have riveted thereon friction facings 16.

Slots 20 in friction member 10 are provided to make it somewhat flexible.

As is well known to the art, facings 16 are squeezed between the driving plates of the clutch (not shown). As friction member 10 starts to rotate through the play provided by the sliding of rivets 9 in slots 11, springs 12 are pressed against by one of lips 14 and its adjacent edge of openings 13. The other end of said springs reacts against the opposite wall of housings 8 and its adjacent edge of openings 18 in hub member 5. Continued rotation of friction member 10 compresses springs 12 until they develop enough resistance to rotate hub member 5 along with said friction member.

The inside radius of housing 8 is made larger than the outside radius of spring 12 when in uncompressed condition. The inside radius of lugs 15 is the same as that of the inside radius of housing 8. This provides clearance for the spring when it swells under compression.

I claim:—

1. A driven member for friction clutches, comprising a hub member having a flange, a friction member with its inner portion overlapping said flange on one side thereof, the outer portion of the friction member extending radially substantially as an annular disc beyond the flange for supporting friction facings on its sides, means for slidably fastening together said flange and friction member, the overlapped parts of said flange and friction member having registering substantially rectangular openings, coil springs seated in said openings forming a sectional spring cushion between the friction member and the hub member, said springs being of greater outside diameter than the combined thickness of said parts adjacent said openings, semi-cylindrical housings integral with said flange extending from all the edges of its openings over the springs on the side thereof away from the friction member, and means at the openings integral with the friction member extending over the spring on the side of the friction member away from the flange, said housings and said means retaining the springs between them in the openings.

2. A driven member for friction clutches, comprising a hub member having a flange, a friction member overlapping said flange on one side thereof, means for slidably fastening together said flange and friction member, the overlapped parts of said flange and friction member having registering openings, coil springs seated in said openings forming a sectional spring cushion between the friction member and the hub member, means at the openings in the flange integral with the flange extending over the side of the springs on the side thereof away from the friction member, and lips at the openings in the friction member extending from the sides of the latter openings which are parallel to the longitudinal axes of the springs, said lips extending over the springs on the side away from the flange, said means and lips retaining the springs between them in the openings.

3. A driven member for friction clutches, comprising a hub member having a flange, a friction member overlapping said flange on one side thereof only, means for slidably fastening together said flange and friction member, the overlapped parts of said flange and friction member having registering openings, coil springs seated in said openings forming a sectional spring cushion between the friction member and the hub member, said springs being of greater outside diameter than the combined thickness of said parts adjacent said openings, said flange having projections at the ends of its openings located at the ends of the springs, said projections extending substantially at right angles from said ends of the openings in a direction away from the friction member for engaging the ends of the springs.

4. A driven member for friction clutches, comprising a hub member having a flange, a friction member overlapping said flange on one side thereof, means for slidably fastening together said flange and friction member, the overlapped parts of said flange and friction member having registering openings, coil springs seated in said openings forming a sectional spring cushion between the friction member and the hub member, means at the openings in the flange integral with the flange extending over the side of the springs on the side thereof away from the friction member, lips at the openings in the friction member extending from the sides of the latter openings which are parallel to the longitudinal axes of the springs, said lips extending over the springs on the side away from the flange, and other lips for engaging the ends of the springs at the edges of the openings in the friction member at the ends of the springs, said latter lips extending substantially at right angles to the friction member in a direction away from the flange, said means and lips retaining the springs between them in the openings.

5. A driven member for friction clutches comprising a hub member having a flange, a friction member in annular relation to the hub member having its outer portion in substantially radial alignment with said flange and its inner portion overlapping said flange, said inner portion being offset axially from the outer portion to come in contact with one face of said flange, said outer portion extending radially substantially as an annular disc beyond the flange for supporting friction facings on both faces of said disc, means located at their overlapped parts for fastening together said flange and friction member with a limited relative rotation, said overlapped parts having registering openings, and coil springs seated in said openings between the end walls thereof, said springs having greater outside diameter than the combined thickness of said parts where they overlap and forming a sectional spring cushion between the friction member and the hub member.

6. A driven member for friction clutches comprising a hub member having a flange, said flange having an annular recess formed in one face extending radially inward from its outer edge part way to the hub member, a friction member in annular relation to the hub member with its inner portion coming in said recess against the flange and overlapping said flange on one face only, said recess being of sufficient depth axially, to enable the outer portion of the friction member to be in substantially radial alignment with said flange, said outer portion extending radially substantially as an annular disc beyond the flange for supporting friction facings on both faces of said disc, means located at their overlapped parts for fastening together said flange and friction member with a limited relative rotation, said overlapped parts having registering openings, and springs seated in said openings between the end walls thereof forming a sectional spring cushion between the friction member and the hub member.

7. A driven member for friction clutches comprising a hub member having a flange, said flange having an annular recess formed in one face extending radially inward from its outer edge part way to the hub member, a friction member in annular relation to the hub member with its inner portion coming in said recess against the flange and overlapping said flange on one face only, said inner portion being offset axially from the outer portion of the friction member, the offset and depth of recess axially being sufficient to have the outer portion substantially in radial alignment with the flange, said outer portion extending radially substantially as an annular disc beyond the flange for supporting friction facings, means located at their overlapped parts for fastening together said flange and friction member with a limited relative rotation, said overlapped parts having registering openings, and springs seated in said openings between the end walls thereof forming a sectional spring cushion between the friction member and the hub member.

8. A driven member for friction clutches comprising a hub member having a flange, a friction member in annular relation to the hub member with its inner portion overlapping said flange and extending over one face only of said flange, the outer portion of the friction member extending radially substantially as an annular disc beyond the flange for supporting friction facings, the overlapped parts of said flange and friction member having registering substantially rectangular openings, coil springs seated in said openings between the end walls thereof forming a sectional spring cushion between the friction member and the hub member, said springs being of greater outside diameter than the combined thickness of said parts adjacent said openings, portions of said flange extending out from opposite edges of the openings at each opening in the flange in a direction away from the friction member and over said openings and the springs in them, and portions of the friction member extending out from opposite edges of the openings at each opening in said latter member in a direction away from the flange and over said latter openings and the springs in them, said portions at the openings retaining the springs in the openings.

9. A driven member for friction clutches comprising a hub member having a flange, a friction member in annular relation to the hub member with its inner portion overlapping said flange and extending over one face only of said flange, the outer portion of the friction member extending radially substantially as an annular disc beyond the flange for supporting friction facings, the overlapped parts of said flange and friction member having registering substantially rectangular openings, coil springs seated in said openings between the end walls thereof forming a sectional spring cushion between the friction member and the hub member, said springs being of greater outside diameter than the combined thickness of said parts adjacent said openings, portions of the flange extending out from all edges of the openings at each opening in the flange in a direction away from the friction member, and portions of the friction member extending out from all edges of the openings at each opening in said latter member in a direction away from the flange, said portions of the flange and friction member at the openings retaining the springs in said openings.

10. A driven member for friction clutches comprising a hub member having a flange, a friction member in annular relation to the hub member with its inner portion overlapping said flange and extending over one face only of said flange, the outer portion of the friction member extending radially substantially as an annular disc for supporting friction facings on its sides, the overlapped parts of said flange and friction member having registering openings, coil springs seated in said openings between the end walls thereof forming a sectional spring cushion between the friction member and the hub member, said springs being of greater outside diameter than the combined thickness of said parts adjacent said openings, said friction member having projections at the ends of its openings located at the ends of the springs, said projections extending substantially at right angles from said ends of the opening in a direction away from said flange for engaging the ends of the springs.

11. A driven member for friction clutches comprising a hub member having a flange, a friction member in annular relation to the hub member with its inner portion overlapping said flange and extending over one face only of said flange, the outer portion of the friction member extending radially substantially as an annular disc for supporting friction facings on its sides, the overlapped parts of said flange and friction member having registering openings, coil springs seated in said openings between the ends walls thereof forming a sectional spring cushion between the friction member and the hub member, said springs being of greater outside diameter than the combined thickness of said parts adjacent said openings, said friction member and flange having projections at the ends of their openings located at the ends of the springs, the projections of the friction member extending substantially at right angles from said ends of its openings in a direction away from the flange, and the projections of the flange extending substantially at right angles from said ends of its openings in a direction away from the friction member, said projections from the friction member and the flange being adapted to engage the ends of the springs.

MORRIS KATCHER.